US010330134B2

(12) United States Patent
Danko

(10) Patent No.: US 10,330,134 B2
(45) Date of Patent: Jun. 25, 2019

(54) MODULAR PANEL STRUCTURE HAVING MAGNETIC HINGE JOINT

(71) Applicant: Peter Joseph Danko, York, PA (US)

(72) Inventor: Peter Joseph Danko, York, PA (US)

( * ) Notice: Subject to any disclaimer, the term of this patent is extended or adjusted under 35 U.S.C. 154(b) by 0 days.

(21) Appl. No.: 15/912,850

(22) Filed: Mar. 6, 2018

(65) Prior Publication Data
US 2018/0258965 A1    Sep. 13, 2018

Related U.S. Application Data

(60) Provisional application No. 62/604,028, filed on Jun. 21, 2017, provisional application No. 62/470,331, filed on Mar. 12, 2017.

(51) Int. Cl.
| | | |
|---|---|---|
| *A63H 33/04* | (2006.01) | |
| *F16B 5/00* | (2006.01) | |
| *F16B 1/00* | (2006.01) | |
| *E05D 7/10* | (2006.01) | |
| *G09F 15/00* | (2006.01) | |
| *E05D 1/04* | (2006.01) | |
| *F16B 5/01* | (2006.01) | |
| *A47B 43/00* | (2006.01) | |

(52) U.S. Cl.
CPC .......... *F16B 5/0084* (2013.01); *A63H 33/046* (2013.01); *E05D 1/04* (2013.01); *E05D 7/10* (2013.01); *F16B 1/00* (2013.01); *G09F 15/0062* (2013.01); *A47B 43/00* (2013.01); *E05Y 2201/46* (2013.01); *F16B 5/01* (2013.01); *F16B 2001/0035* (2013.01)

(58) Field of Classification Search
CPC ...... A63H 33/04; A63H 33/10; A63H 33/046; A63H 33/26; H01F 7/02–7/0231; H01F 7/0252–7/0268; F16B 5/0084; F16B 1/00; F16B 2001/0035; F16B 5/01; E05D 1/04; E05D 7/10; G09F 15/0062; A47B 43/00
See application file for complete search history.

(56) References Cited

U.S. PATENT DOCUMENTS

| | | | |
|---|---|---|---|
| 3,599,361 A | 8/1971 | Bowman et al. | |
| 3,998,004 A | * 12/1976 | Ehrlich | ................ A63H 33/046 446/92 |
| 4,958,671 A | 9/1990 | Bove | |
| 4,991,813 A | 2/1991 | Beaulieu | |

(Continued)

FOREIGN PATENT DOCUMENTS

| | | |
|---|---|---|
| FR | 2955137 B1 | 1/2014 |
| FR | 3019206 A1 | 10/2015 |

(Continued)

OTHER PUBLICATIONS

Expo Display Service, "Expofix Magnetic Corner Stand Small", www.expodisplayservice.eu; accessed Jan. 2018.

*Primary Examiner* — Cassandra Davis
(74) *Attorney, Agent, or Firm* — McNees Wallace & Nurick LLC

(57) ABSTRACT

Panels and structures having magnetic hinges. Systems using magnetic hinges providing hinged connections that are flexible or pilotable and that are rigid. The system and hinges enable the construction of simple to highly complex structures with movable components, such as doors and folding shelves, from a small selection of different shapes and sizes of starting components.

10 Claims, 10 Drawing Sheets

(56) References Cited

U.S. PATENT DOCUMENTS

| | | | |
|---|---|---|---|
| 5,388,382 A | 2/1995 | Brooks | |
| 5,439,043 A | 8/1995 | Carter | |
| 5,611,384 A | 3/1997 | Carter | |
| 5,791,391 A | 8/1998 | Carter | |
| 5,829,622 A | 11/1998 | Neuman | |
| 7,131,546 B1 | 11/2006 | Price et al. | |
| 7,154,363 B2 * | 12/2006 | Hunts | H01F 7/0242 335/306 |
| 7,467,440 B2 | 12/2008 | Seidler | |
| 7,770,313 B2 | 8/2010 | Fritsche | |
| 8,312,653 B2 | 11/2012 | Fritsche | |
| 8,517,792 B1 | 8/2013 | Foster | |
| 9,605,459 B2 | 3/2017 | Veino et al. | |
| 2010/0024271 A1 | 2/2010 | Seidler | |
| 2014/0133149 A1 | 5/2014 | Catalano et al. | |
| 2014/0179194 A1 * | 6/2014 | Fein | A63H 33/046 446/92 |
| 2014/0227934 A1 * | 8/2014 | Rudisill | A63H 33/046 446/92 |
| 2016/0184727 A1 * | 6/2016 | Ornstein | A63H 33/046 446/92 |
| 2016/0199749 A1 * | 7/2016 | Whittaker | H01F 7/0252 434/278 |
| 2016/0325429 A1 | 11/2016 | Rus et al. | |
| 2017/0138101 A1 | 5/2017 | Kim et al. | |
| 2017/0338017 A1 | 11/2017 | Fukushima | |

FOREIGN PATENT DOCUMENTS

| | | |
|---|---|---|
| GB | 2497773 A | 6/2013 |
| GB | 2503953 A | 1/2014 |
| JP | 3822062 B2 * | 9/2006 |
| JP | 2015037471 A * | 2/2015 |
| JP | 2016214533 A * | 12/2016 |
| WO | 3078772 A1 | 9/2003 |

* cited by examiner

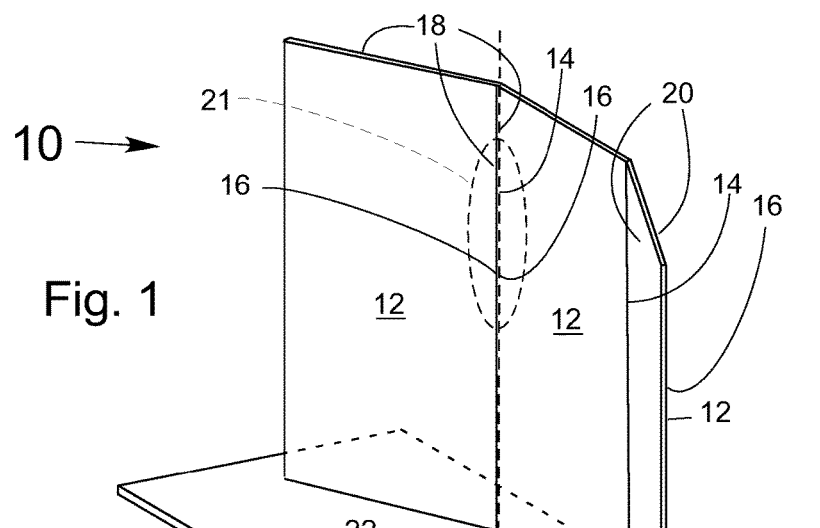
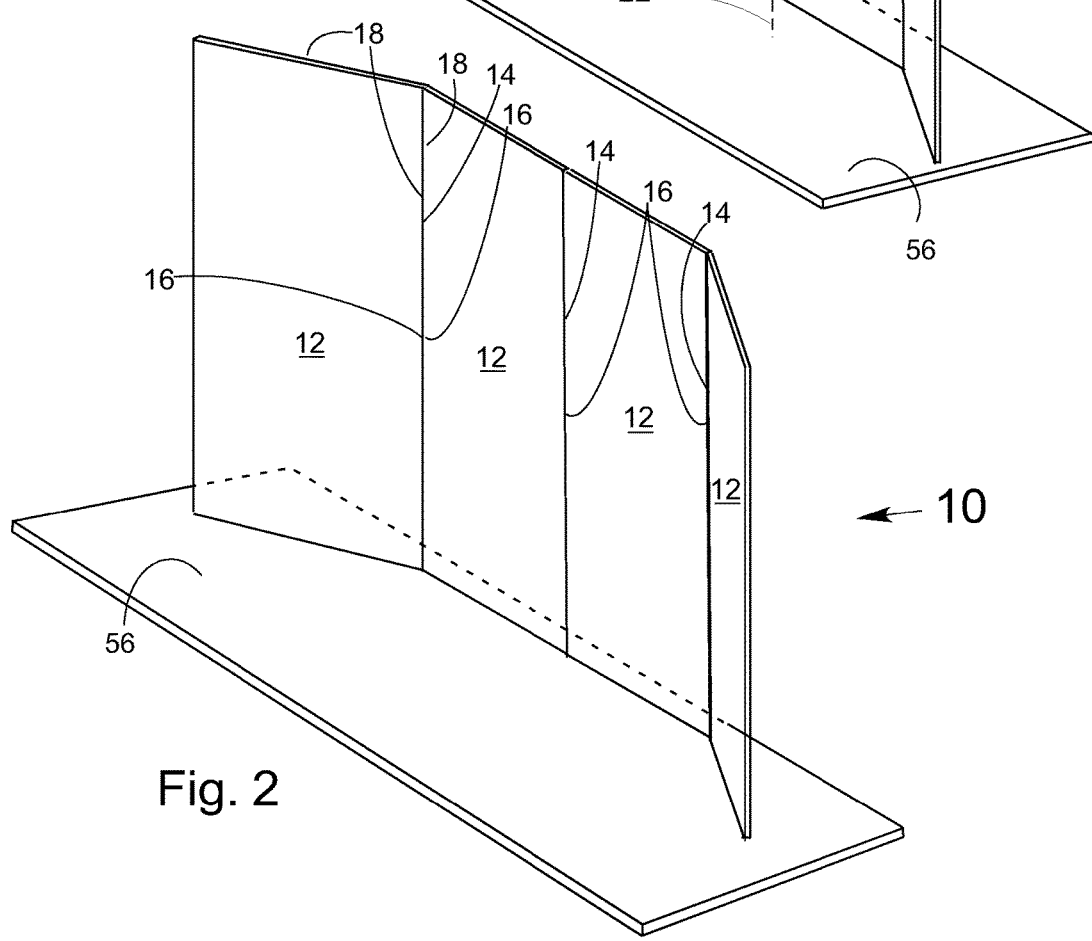

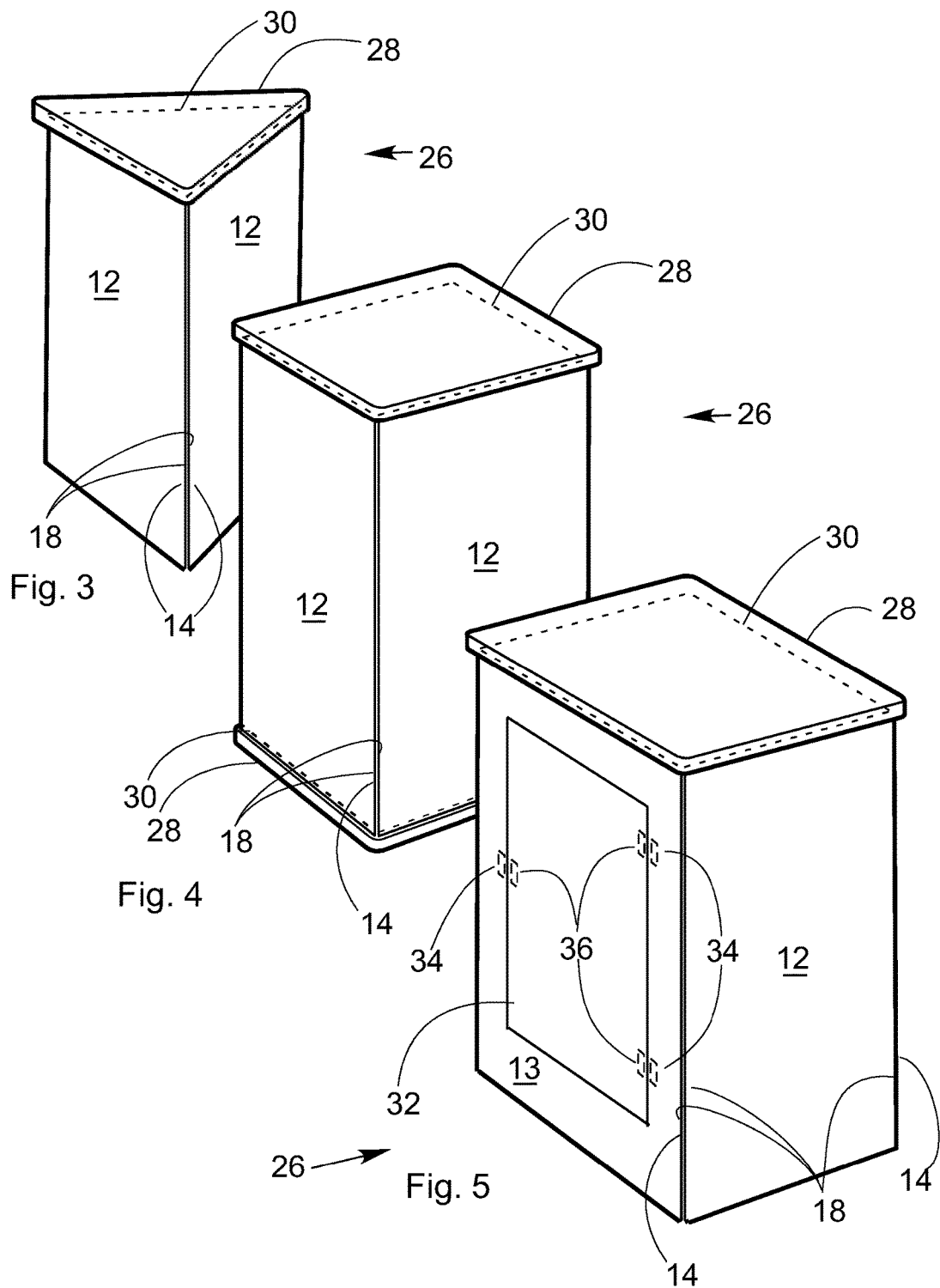

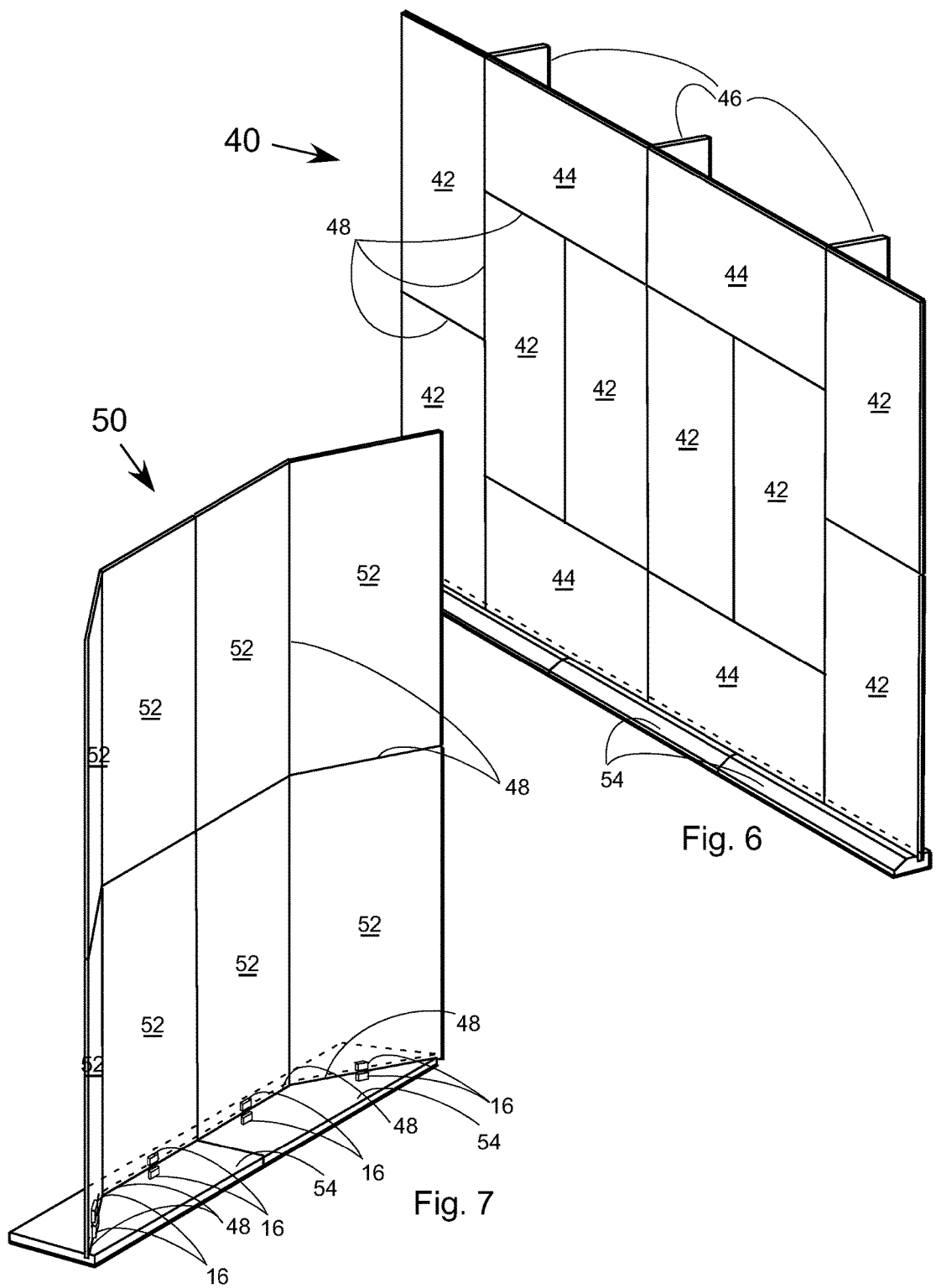

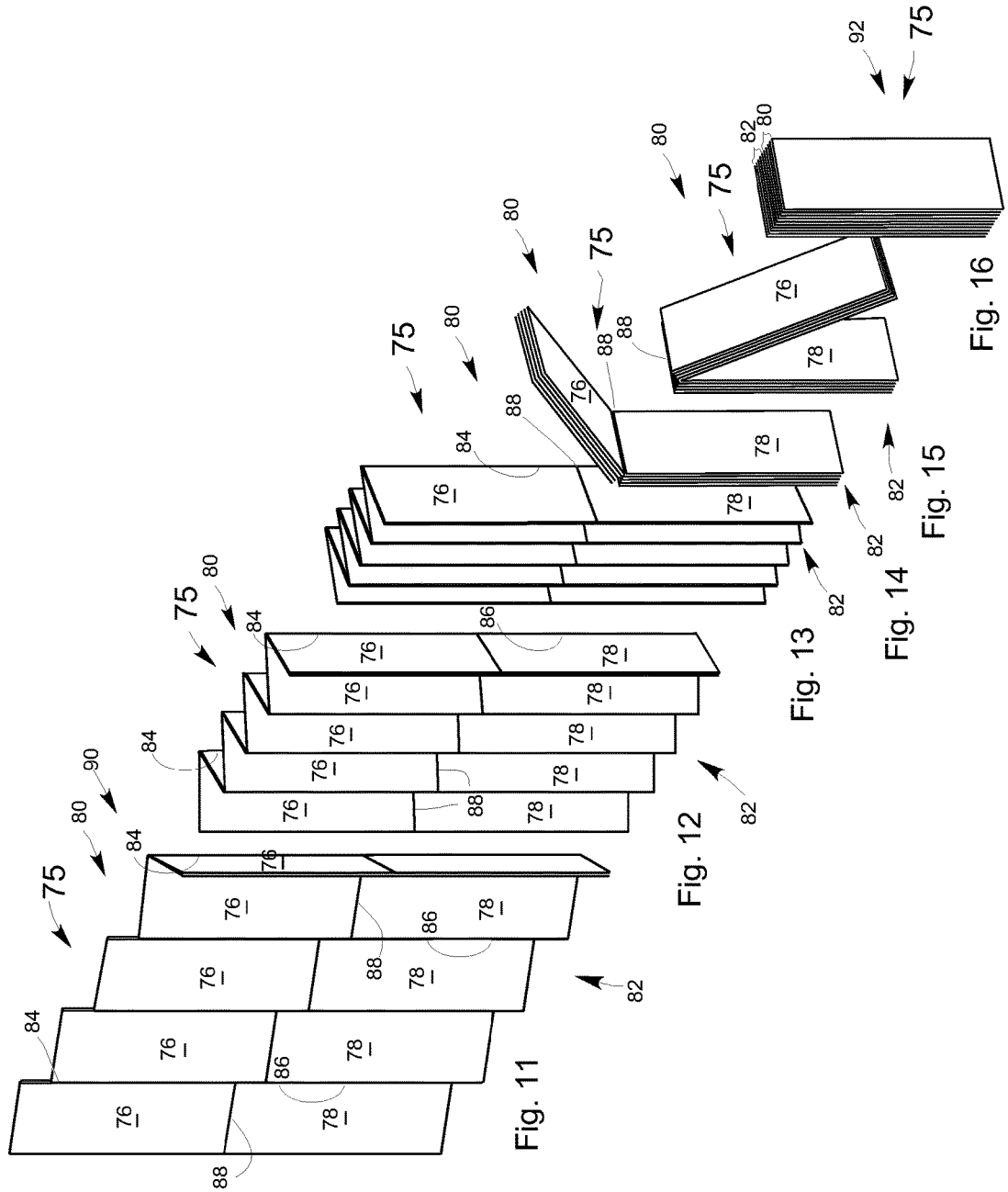

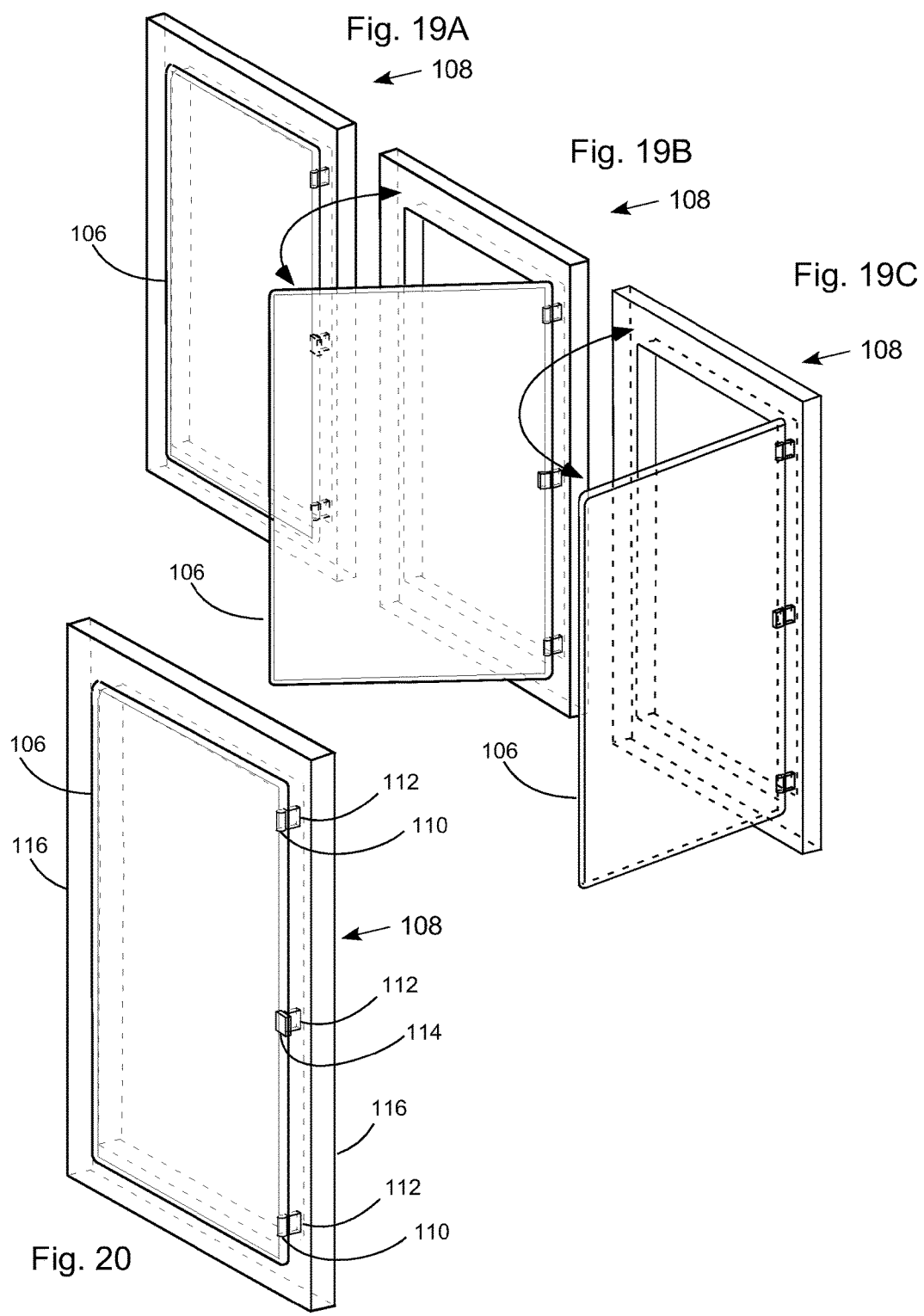

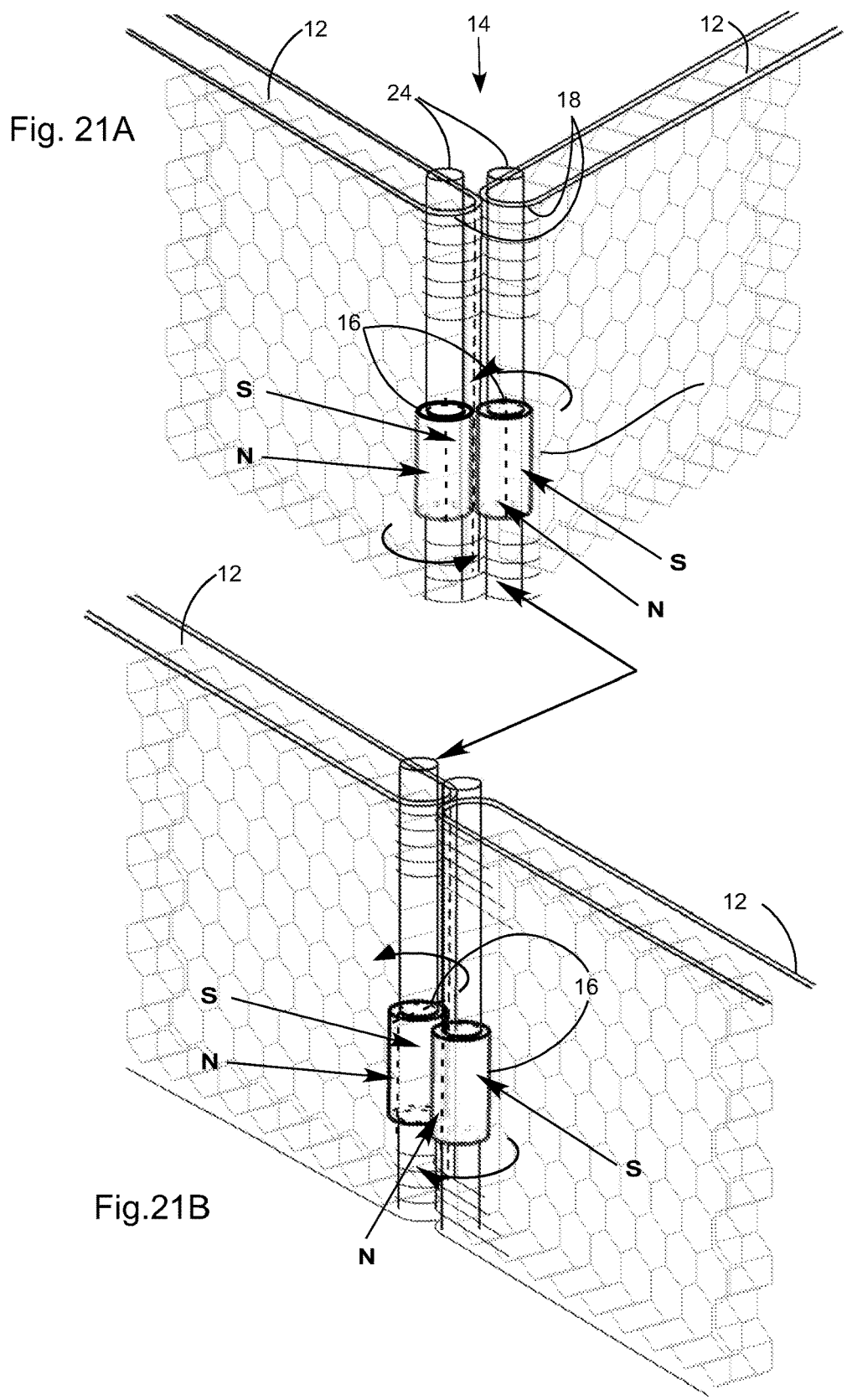

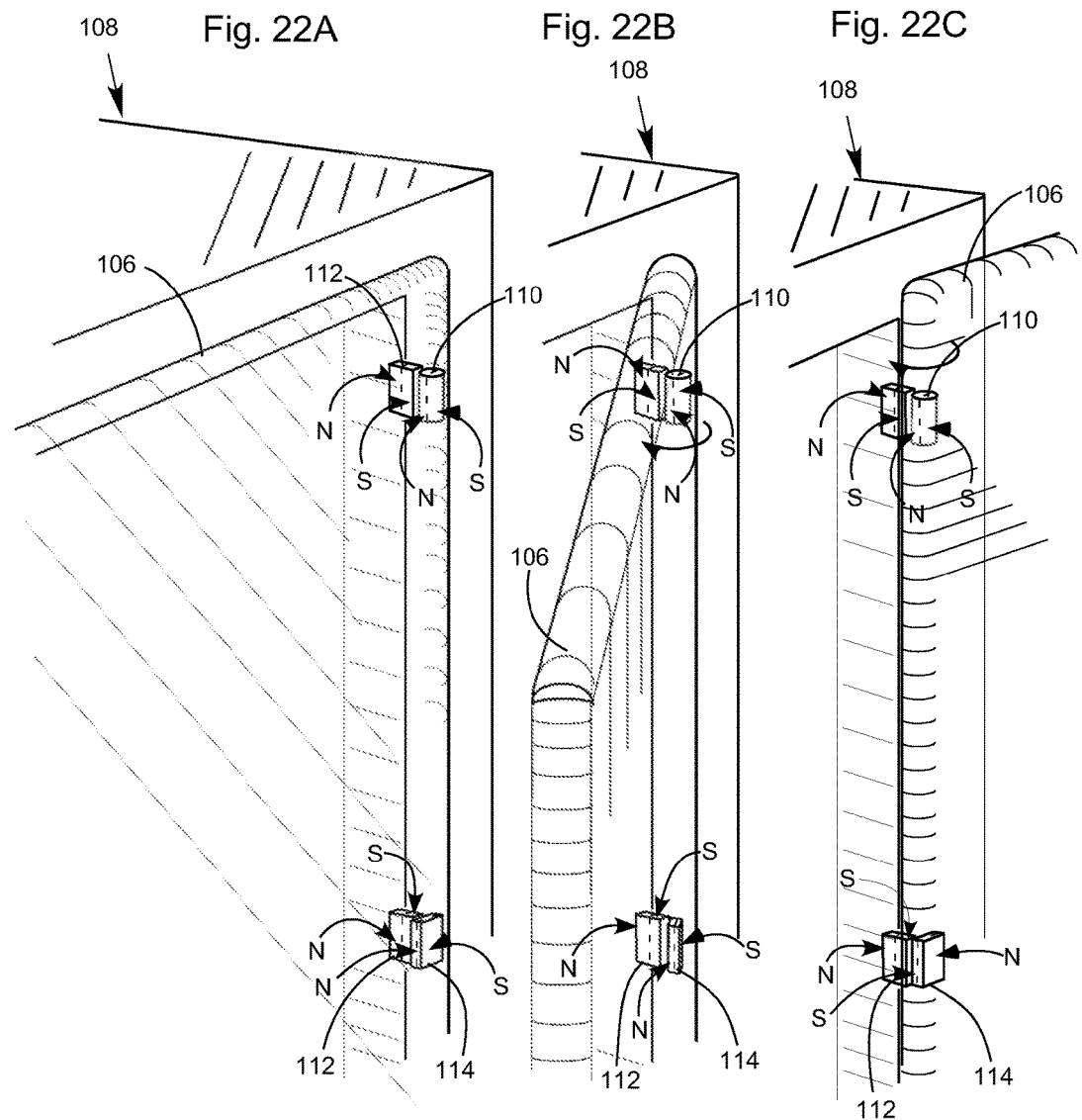

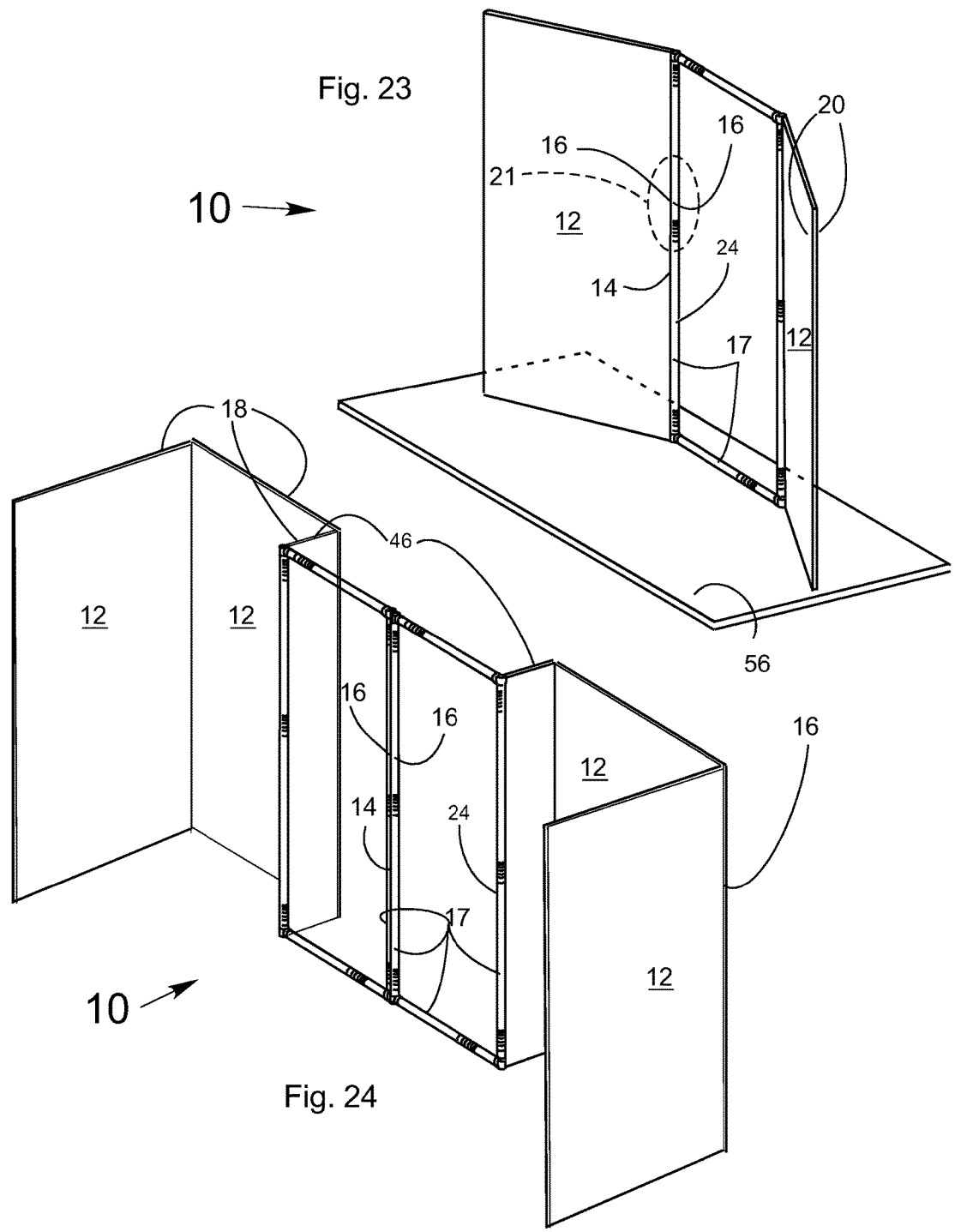

MODULAR PANEL STRUCTURE HAVING MAGNETIC HINGE JOINT

FIELD OF THE INVENTION

Embodiments of the present invention relate to panels and structural components having magnetic connection end portions or edges. The present invention further relates to modular systems, including frames, doors and panels, that are assembled by magnetic connection devices into rigid, movable, and rigid structures with movable components, that are based upon magnetic edge components. Thus, in an embodiment, the present invention relates to exhibit design, signage, and folding screens or partitions.

BACKGROUND OF THE INVENTION

Trade shows, signage, and displays, ranging from stand-alone signs, or table top exhibits, to enclosing a walk-in space with graphics, complete with shelving, cabinetry and tables share similar aspects of function. These panels, first and foremost, typically convey through graphics and form, a dynamic and compelling message. Second, they typically are portable. Third, they preferably are lightweight. Fourth, they typically are easy to assemble with little or no skill.

A failing with many of these structure is the need for tools, and equipment for their assembly. In many settings this need requires the use of third party labor. This can place a burden on the exhibitor, such as through added costs, increased time, the need to ship or purchase tools, and combinations and various of these and other problems. For example, this failing is particularly acute in the area of exhibit walls and cabinetry.

SUMMARY OF THE INVENTION

Thus, there has been a long standing and unfulfilled need for structural components to provide easy to assemble, and preferably without the need for tools, structures and, in particular, structures that are self-supporting and are made of lightweight materials. The present invention, among other things, solves these needs by providing the articles of manufacture, devices and processes taught, and disclosed herein.

Thus, there is provided a structure member defining a plurality of sides, the structural member including: a structural panel, in which the panel defines a first edge, a second edge, and a third edge; the structural panel defining a panel length between the first edge and the second the edge; the first edge defining a first edge length, the second edge defining a second edge length, and the third edge defining a third edge length; the structural panel having a weight and defining a rigidity, in which the structural panel is load bearing, in which the structural panel has a compressive strength along its length, in which the structural panel compressive strength is capable of supporting at least 2 times its own weight; the structural panel having a first magnet(s) positioned along the first edge, a second magnet(s) positioned along the second edge and third magnet(s) positioned along the third edge; a first magnet(s) defining a first magnet length, the second magnet(s) defining a second magnet length, and the third magnet(s) defining a third magnet length; in which the length of each magnet is from about 5% to about 100% of the length of its respective edge; in which the polarity of each magnet is configured with respect to the other magnets to make the panel capable of being magnetically connected to panels having the same configuration.

Additionally, there is provided a modular panel structure including at least two frameless panels having opposed surfaces and at least three linear outer peripheral edges; each edge separating and in contact with the opposed surfaces; at least two edges of each panel having at least one magnet positioned interior of the panel and extending therealong; the at least one magnet capable of rotation about an axis of the at least two edges relative to the corresponding panel; in which a magnetic hinge is formed in response to the at least one magnet of one edge of the at least two edges of the at least two panels being aligningly brought together, the magnetic hinge forming a free-standing panel structure stabilizingly supported solely by the magnetic hinge.

Moreover, there is provided a modular panel including: a frameless panel having opposed surfaces and at least three linear outer peripheral edges; each edge separating and in contact with the opposed surfaces; at least two edges of the panel having at least one magnet positioned interior of the panel and extending therealong; the at least one magnet capable of rotation about an axis of the at least two edges relative to the panel; in which a magnetic hinge is formed in response to the at least one magnet of one edge of the at least two edges of the panel being aligningly brought together with one edge of at least two edges of another panel, the magnetic hinge forming a free-standing panel structure stabilizingly supported solely by the magnetic hinge.

Further, there is provided a method of collapsing a modular panel structure including: providing a rectangular modular structure in an open position including: a first pair of rectangular panels having a vertical first magnetic hinge rotatable about a first axis and a second pair of rectangular panels having a vertical second magnetic hinge rotatable about a second axis coincident with the first axis, upper edges of the first pair of panels vertically supporting corresponding lower edges of the second pair of panels along a horizontal third magnetic hinge perpendicular to the first axis; simultaneously rotating corresponding panels of the first pair of panels and the second pair of panels about the first axis toward one another until achieving a closed position; and simultaneously rotating the second pair of panels relative to the first pair of panels about the third axis until achieving a fully collapsed position.

Yet still further, there is provided a system having a plurality of the structural components described herein, in which the system only requires one shape and size of structural panel to build screens, walls, cabinets, tables, volumetric structures, that have a height from 3 inches to about 5 feet.

Moreover, there is provided a system having a plurality of the structural components described herein, in which the system only requires one shape and size of structural panel to build screens, walls, cabinets, tables, volumetric structures, that have a height from 6 inches to about 20 feet.

In addition, there is provided a system having a plurality of the structural components described herein, in which the system only requires one shape and size of structural panel to build screens, walls, cabinets, tables, volumetric structures, that have a length from 3 inches to about 2 feet.

Yet additionally, there is provided a system having a plurality of the structural components described herein, in which the system only requires one shape and size of structural panel to build screens, walls, cabinets, tables, volumetric structures, that have a length from 6 inches to about 20 feet.

Still further, there is provided a system having a plurality of the structural components described herein, in which the system has two panels, each having the same shape and different size of structural panel to build screens, walls, cabinets, tables, and other volumetric structures.

Moreover, there is provided a system having a plurality of the structural components described herein, in which the system has two panels, each having a different shape and a different size of structural panel to build screens, walls, cabinets, tables, and other volumetric structures.

There is provided a system having a plurality of the structural components described herein, in which the system only requires one shape and size of structural panel to build screens, walls, cabinets, tables, volumetric structures, that have a volume of about 0.5 feet$^3$ to about 1,000 feet$^3$.

There is provided a system having a plurality of the structural components described herein, in which the system only requires one shape and size of structural panel to build screens, walls, cabinets, tables, volumetric structures, that have a volume of about 1 feet$^3$ to about 2,000 feet$^3$ or from about 1 foot$^3$ to about 20 feet$^3$.

There is provided a system having a plurality of the structural components described herein, in which the system only requires in an embodiment only one shape and size of structural panel to build screens, walls, cabinets, tables, volumetric structures, that have a height for from 3 inches to about 2 feet.

There is provided a system having a plurality of the structural components described herein, in which the system only requires in an embodiment only one shape and size of structural panel to build screens, walls, cabinets, tables, volumetric structures, that have a height for from 1 foot to about 20 feet can be configured.

There is also provided, these structural panels and system, having one or more of the following features, where the panel is made from a lightweight corrugated or hollow core material; in which the panel is made from a lightweight plastic material; in which the panel is made from a lightweight cellulosic material; in which the panel is made from a lightweight composite material; in which the composite comprises a plastic and a reinforcing material; in which the reinforcing material is selected from the group consisting of fibers, nanotubes, powders, pellets, tow, staple fibers, structures, woven materials, and non-woven materials and a combination thereof; in which the reinforcing materials are selected from the group consisting of ceramics, glasses, graphite, carbon, metal powders, carbide pellets or components, staple fibers, tow, nanostructures and plastics and a combination thereof.

There is also provided, these structural panels and system, having one or more of the following features, in which the structural panel consists of three sides; in which the structural panel has four sides; in which the structural panel has four sides and each side has a magnetic edge; in which the structural panel has five sides; in which the structural panel has five sides and each side has a magnetic edge.

There is also provided, these structural panels and system, having one or more of the following features, in which the panels contain graphics, act as a screen for the projection of graphics, can be configured into a shape and space to act as a compelling foundation for the artwork, graphics, product placement and display.

BRIEF DESCRIPTION OF THE DRAWINGS

FIG. 1 is an upper perspective view of an exemplary embodiment of a panel structure according to the present invention.

FIG. 2 is an upper perspective view of an exemplary embodiment of a panel structure according to the present invention.

FIGS. 3-8 are an upper perspective views of an exemplary embodiments of panel structures according to the present invention.

FIGS. 11-16 are sequential steps for collapsing a panel structure according to the present invention.

FIGS. 19A, 19B, and 19C are upper perspective views of a cabinet having a magnetic door shown in different door positions according to the present invention.

FIG. 20 is an upper perspective view of the cabinet of FIGS. 19A, 19B, and 19C according to the present invention FIGS. 21A and 21B are upper perspective views of a panel structure shown in different rotational positions according to the present invention.

FIGS. 22A, 22B, and 22C are upper perspective views of a cabinet having a magnetic door shown in different door positions according to the present invention.

FIG. 23 is an upper perspective view of an exemplary embodiment of a panel structure according to the present invention.

FIG. 24 is an upper perspective view of an exemplary embodiment of a panel structure according to the present invention.

Wherever possible, the same reference numbers will be used throughout the drawings to represent the same parts.

DETAILED DESCRIPTION OF THE INVENTION

Figure 8:
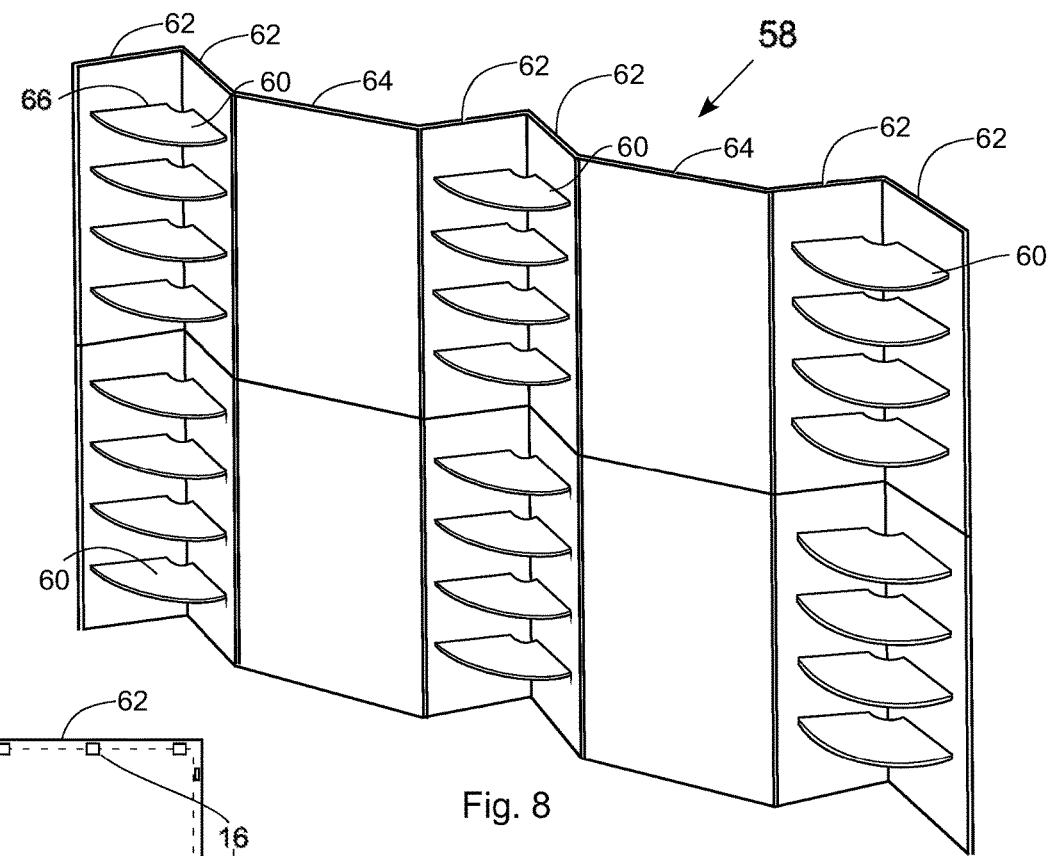

As used herein unless stated otherwise terms "portable," "portable structure," "portable article," "panel structure," and similar such terms are to be given their broadest meaning possible, and would include structures and articles that are readily packed into small, or smaller shippable configurations and then readily unpacked and constructed or assembled at their point or location of use; and when constructed, at this location, are intended to be taken down, disassembled, moved or removed after their particular purpose has been fulfilled. In general, portable structures should be capable of going through the cycle of being assembled, disassembled, packaged and shipped repeatedly, and preferably, 10s and 100s of times or more.

As used herein, unless stated otherwise, the terms "physically connected structures," "physical connection," "physical attachment," and similar such terms means structures and articles that have panels or components that are joined together and held together, either rigidly or movably, by physical articles, such as nails, screws, glue, welds, brazing, pins, detents, friction fits, sweated joints, temperature utilized friction fits, tongue and groove joints, and combinations and variations of these and other physical means of attaching components together. These terms do not include, and expressly exclude joints or hinges, and other attachment means that use magnetism, and, in particular, use magnetism as the primary means for holding the two components together. By primary, as used in this paragraph, it is meant that the magnetic field bears or provides from about 70% to about 100% of the strength of the joinder, from about 95% to about 100% of the strength of the joinder, at least about 70% of the strength of the joinder, at least about 85% of the strength of the joint or hinge, at least about 90% of the strength of the joinder, and about 100% of the joinder. That is, in one embodiment, the magnetic hinge or magnetic hinge joint solely stabilizingly supports or holds two or more components together, such as a free-standing panel structure.

As used herein, the term "hinge" or "hinge joint" refers to a hinge permitting motion in one plane or having one degree of freedom such as rotational movement about one axis, such as an elbow joint or knee joint.

As used herein, unless stated otherwise, the term "plastic" is to be given its broadest possible meaning, and would include among other things, synthetic, or semi-synthetic organic polymeric materials that are capable of being molded or shaped, thermosetting, thermoforming, thermoplastic, orientable, biaxially orientable, polyolefins, polyamide, engineering plastics, textile adhesives coatings (TAC), plastic foams, styrenic alloys, acrylonitrile butadiene styrene (ABS), polyurethanes, polystyrenes, acrylics, polycarbonates (PC), epoxies, polyesters, nylon, polyethylene, high density polyethylene (HDPE), very low density polyethylene (VLDPE), density polyethylene low density (LDPE), polypropylene (PP), polyvinyl chloride (PVC), polyethylene terephthalate (PET), polybutylene terephthalate (PBT), poly ether ethyl ketone (PEEK), polyether sulfone (PES), bis maleimide, and viscose (cellulose acetate).

As used herein, unless stated otherwise, the term "hollow core" and similar terms are to be given the broadest meaning possible, and would include materials such as lightweight material provided between exterior surfaces, such as surfaces of a panel or door, including material subjected to folding, including corrugation, extrusion, such as honeycomb, of any geometric shape, or other process resulting in a non-solid arrangement of the material.

U.S. Pat. Nos. 8,196,260 and 7,657,971 generally relate to magnetic hinges, the entire disclosure of each of which is incorporated herein by reference.

Generally, the term "about" as used herein, unless specified otherwise, is meant to encompass a variance or range of ±10%, the experimental or instrumental error associated with obtaining the stated value, and preferably the larger of these.

Embodiments of the present invention relate to panels and structural components, and systems of these panels, components, and structural components having magnetic connection end portions or edges and a method for collapsing same.

Generally, embodiments of the present invention relate to modular systems of components, e.g., structural and non-structural members, such as panels, frames, windows, shelves, cabinets, and doors, that have one or more magnetic edge section. The magnetic edge section of the components allows the components to be assembled in many different configurations.

Thus, and generally, in embodiments the components are configured into predetermined shapes and sizes, preferably labeled, and are assembled into the same predetermined configuration each time. Embodiments can have predetermined shapes and sizes and be capable of being configured into one, two, three, four, or more predetermined configurations. Embodiments can have a large plurality (e.g., 10, 20, 50, 100s and more total components) of only a few predetermined shapes and sizes, e.g., a square shape and a rectangle shape (of two of the squares). With this plurality of components, the system can be capable of being configured into one, two, three, four, 10s, or 100s of predetermined configurations. In embodiments of the present invention, further combinations and variations of these systems of predetermined configurations can be made utilizing the magnetic edge panels of the present invention.

The present invention further relates to modular systems, and more preferably portable modular systems, including frames, doors, and panels, that are assembled by magnetic connection devices into rigid, movable structures and rigid structures with movable components, that are based upon the magnetic edge panels. In one embodiment, panels, frames, and doors are made from hollow core materials, honeycomb, or corrugated plastics. In one embodiment, panels, frames, and doors are substantially planar. In one embodiment, one or more panels, frames, and doors are rigid. In one embodiment, panels, frames, and doors are nonplanar, and may include an uneven, non-flat surface and a thick or irregular non-thin configuration.

For example, in an embodiment, the panels can be connected together along one edge to form a v-like assembly that when opened to a sufficient angle is self-standing. In another example, four square panels can be assembled together along their four edges to form a cube, with its top and bottom open. A fifth panel, having only a magnetic edge on one side can be added to the cube to form a hinged panel, e.g., a door. A sixth panel, having at least two magnetic edges, and preferable four, can be added to the cube to form a bottom.

Thus, typically, and by way of example, components, e.g., panels, connected along one magnetic edge will form a flexible, e.g., hinged assembly and configuration. Thus, typically, and by way of example, components, e.g., panels, connected along two or more magnetic edges, can form a rigid assembly and configuration. In being understood, that number and manner of connections depends upon the shape of the components and the number of components being assembled into a configuration, to provide flexible connections, and rigid connections. In being understood that several flexible assemblies can further be assembled with other panels or each other to provide a rigid, and more preferably, structural assembly. A flexible assembly, such as a foldable three panel screen, can also be a structural assembly, as it is self-standing when open.

Embodiments of the present invention can find application in structures and articles that are preferably of a temporary or portable nature. It being understood, that such a temporary structure, especially if made from reinforced plastic materials can have a long time, exceeding one, two or more years. Thus, embodiments of the present invention can be configured and would include, for example, such temporary or portable structures like, folding screens, temporary partitions, display booths, shelving, cabinets, signage, signs, portable office furniture, portable furniture, temporary or portable labs, portable housing, field medical units, portable clean rooms for optics, testing, or other field work, play houses and toys, trade shows, fairs, other public, semi-public and private events or activities where temporary structures or displays are needed or used. Thus, in an embodiment, the present invention relates to exhibit design, signage, and folding screens, or partitions. They can be used to form exhibits for trade shows, desktop displays, and collapsible cabinetry for same. It is important to note that the magnets are imbedded in lightweight panels for a variety of reasons that are enumerated below.

In an embodiment, the printed panel(s) used for these displays are generally a hollow core plastic material, including honeycomb, or corrugated material such as plastic, on which can be printed graphics to convey a message on one or more exterior surfaces of the printed panel(s). These panels preferably are formable, e.g., the panels while rigid and structurally capable of holding their own weight, can be configured into volumetric shapes, and thus provide shapes, surfaces, and volumetric spaces to act as a compelling foundation for the artwork, graphics, and display. They must also be opaque, having any color, serve as a screen for the projection of an image or graphics, be translucent, or combinations and variations of these, as the design requires to attract attention in the conveyance of the message.

In an embodiment of the present invention, the system and structural panels have portability. Thus, for example, the component panels of an exhibit can be compacted or nested for shipment and, with appropriate container, preferably are able to be shipped in a manner suited, depending on container design, to ship LTL common carrier, or ship to the specifications of small package shipping such as FEDEX or UPS. In an embodiment, the exhibit design, when disassembled can easily fit into an automobile trunk or the back of an SUV.

In another embodiment, the panels are preferably lightweight. One advantage from this is reduced shipping costs. Further advantages from this are the ability to meet exhibit hall regulations and drayage costs. Costs for moving exhibit materials to and from designated exhibit spaces typically can be very expensive currently about $300 per 100 pounds. A prior conventional 10'×10' or 10'×20' exhibit area can weigh between 1000 to 2000 lbs. and more. Further, exhibit facility set-up rules may be stringent, such as permitting exhibitors to carry, without charge, only exhibit materials that can be carried by one person by hand. Thus, a lightweight exhibit that can be inexpensively shipped and carried by the exhibitor by hand to the allocated space would be quite advantageous.

In examples of embodiments of the present panels and systems a 10'×10' or 10'×20' exhibit area can weigh less than 2,000 lbs., less than about 1,000 lbs., less than about 500 lbs., less than about 200 lbs., from between 100 lbs. to about 500 lbs., from between about 150 lbs. to about 350 lbs., and greater and lesser amounts. Further the modular nature of the system allows for one group of panels to be shaped in a predetermined manner that allows them to be configured into one, two, three, four, or more volumetric shapes of predetermined sizes and shapes. Embodiments of the present panels and systems also allows for the joining of two or more of such systems to build larger and more complex configurations. Thus, for example four small 10×10×20 area systems, (that can fit each fit in an SUV or mini-van, e.g., they are about 3×3×6 when disassembled and packed for shipping) can be configured together to make a much larger exhibit.

In an embodiment of the present invention, the system is predetermined and of sizes and shapes for a particular display. In this system no physical connectors e.g., pins, tape, bracket, clips, etc. are needed to assemble the system. As such, no tools are needed to assemble the system. Thus, the packed for shipment display contains only the structural panels for the display, and can be assembled into the predetermined volumetric shape, e.g. an exhibit booth, sign, or display, without the need for tools. Thus, the package display has only structural panels, and only those panels are needed to assemble the display. In this manner skilled laborers, mechanics, or engineers are not needed to configure the display. Among other things, the advantages of assembling with little or no skill is highly beneficial. Exhibitors learning to assemble and disassemble their displays is at best tangential to their job, and at trade shows they are often pressed for time with other duties. The present embodiment of magnetic panels and systems provides advantages over even the simplest of existing displays that are designed to be assembled without tools, but still use physical fasteners such as wing nuts, cable ties, clips, and the like, which are time consuming, can require help to align and hold while securing panels into an exhibit, and inevitably, and, unfortunately, can become lost or misplaced.

In an embodiment of the present invention, the panels and systems from those panels provide, for example, an advantage of being able to assemble panels, fixtures, and fixtures on panels, and combinations of these and other structures and articles, quickly and without tools. In addition to speeding assembly time, typically, exhibit halls strictly enforce a tool rule. This means, in many locations, that the exhibitor must hire a preauthorized carpenter for any task, requiring even the simplest tool.

Embodiments of the present invention described herein, and their advantages of interconnecting magnetically attracted panels, for example, in the trade show market are significant. Instead of using fasteners and extrusions, or other physical types of attachments, e.g., screws, nuts, wingnuts, bolts, pins, etc., to join panels, embodiments of the present invention use magnets associated with, on or in the edges of lightweight panels, that provided for folding, and disassembly and unfolding and reassembly on a structure. Assembly for the basic structure is instantaneous, precise, sturdy, and does not require tools, providing significant advantages over existing systems.

The magnets are affixed to one or more of the edges of the components, e.g., panels. For example, using a rectangular panel as an example, the panel has a width and a length that is 3× the width. The panel has a front and back planar surfaces and four edges. In this embodiment, the panel can preferably be made from a corrugated plastic material, that is both lightweight and strong. The magnets are attached to the edges of the panel. One, two, three, or all four of the edges can have magnets attached to them. Preferably the magnets are permanently attached to the edges. In embodiments that can preferably be integral with the panel and form the edge of the panel or be adjacent to the edge. The magnets can be embedded into the edges, incorporated into the edges during forming, or glued into the edges during or after forming of the panels. Other methods and techniques to incorporate or attach the magnets into the panel that are known to the art can also be employed.

The panels can be any shape, for example they can be triangles, squares, rectangles, pentagons, hexagons, other polygons, random shapes, circles, and tubes. The panels can be the shapes of and be used to make expansion structures of the type envisioned, designed, developed by Buckmister Fuller, and those that are based upon or similar to such designs. Thus, for example, the components can be the shape for, and configured, into a geodesic dome.

The magnets can be any type of magnet presently known, or later developed, and would include those characterized as permeant magnets, temporary magnets, and electric magnets and combinations and variations of these. For example, if electric magnets are used the power cables can be built into or affixed to the panels. Typically, permanent magnets are those types of magnets that, generally, once magnetized, retain a level of magnetism, and preferably the level of magnetism initially provided. (Unless they are subjected to high temperature or other phenomena that will demagnetize the material.) Typically, temporary magnets act like a permanent magnet when they are within a strong magnetic field but lose their magnetism when the magnetic field disappears. An example of a material that can be a temporary magnet would be soft iron, such as a paper clip. An electromagnet is typically a tightly wound helical coil of wire, usually with an iron core, which acts like a permanent magnet when current is flowing in the wire. The strength and polarity of the magnetic field created by the electromagnet are adjustable by changing the magnitude of the current flowing through the wire and by changing the direction of the current flow.

Preferably the edge magnets of the present invention use permanent magnets. Permanent magnets, for example can be made from materials such as Neodymium Iron Boron (NdFeB or NIB), Samarium Cobalt (SmCo), Alnico, Ceramic and Ferrite. Preferred permanent magnets for the edge magnets of the present invention are rare earth magnets. By way of example, and without limitation, one such preferred rare earth magnet is made from neodymium (Nd—Fe—B).

The edge magnet along the edge of a panel may have a length that is about 20% of the length of the edge to about 100% of the length of the edge, a length that is about 80% the length of the edge to about 100% the length of the edge, that is about 70% (e.g., FIG. 9), a length of the edge to about 90% the length of the edge, a length that is at least about 70% of the length of the edge, at least about 80% of the length of the edge, at least about 90% of the length of the edge, at least about 95% of the length of the edge, about 100% the length of the edge, and the same as the length of the edge; smaller and larger, e.g., extending beyond the length of the edge, lengths of the magnet may also be utilized. The edge magnet can be a single magnet, or it can be a plurality of smaller magnets spaced along the edge of the panel.

In embodiments one or more magnetics, e.g. rectangular, oval, elongate, magnetic strip, or rod, etc., may be incorporated into the edge of the panel. Thus, the panel edge can have one, two, three, four, five, six, 10 or more magnets along its edge, and these magnets can, in total, make up from 20% to 100% of the length of the edge.

In embodiments one or more magnets can be incorporated into location(s) away from the edge of the panel, e.g., away from the periphery, in the center of a panel, or other location(s) in the body of the panel, and thus provide a location(s) for an attached a shelf, cabinet, or volumetric structure.

Preferably the polarity of the magnets along or making up the edge of the panels is configured so that each panel can attach to another panel in any orientation. Thus, polarity of the magnets does not play a role in the assembly of the structure. If, on the other hand, there is a desire to have panels configured in a particular orientation, the polarity of the magnets can be configured to accomplish this i.e., the panels can only go together in one manner.

In embodiments the components may be tubular structures that are already formed having magnets at the ends, i.e., the circular edges of the tube. The panel may also be flexible enough, or have longitudinal creases, that allows the panel to be formed, e.g., rolled, into a tubular structure with its longitudinal edge being joined by magnets. The top and bottom end of the thus formed tubular structure may further have magnets in their edge, thus enabling the tubular structures to be joined end to end, joined to a connector (e.g., a square to make straight, right angle and both connections between tubulars), and other configurations and variations of these.

Turning to the drawings, there are shown in FIGS. 1 and 2 upper perspective views of respective free-standing modular panel structures 10 and systems of embodiments of the present invention. In this configuration as shown, panel structures 10 include modular panels 12, such as frameless panels having opposed surfaces 20 and four linear outer peripheral edges 18, with each edge separating and in contact with the opposed surfaces 20. At least two edges 18 of panel 12 have at least one magnet 16 positioned interior of the panel and extending along the edges. In one embodiment, the magnets are not visually apparent, i.e., the opposed surfaces 20 and profile of the panel 12 adjacent the magnet(s) 16 is generally uniform. Magnet(s) 16 are capable of rotation about an axis 22 of edges 18 relative to the panel. A magnetic hinge or magnetic joint or magnetic hinge joint 14 is formed in response to magnet(s) 16 of one edge 18 of one panel 12 being aligningly brought together with one edge 18 of another panel 12, the magnetic joint 14 forming a free-standing panel structure 10 stabilizingly supported solely by the magnetic joint. In one embodiment, the length of the magnet(s) 16 is 100% of the length of the panel 12. In one embodiment, axis 22 of magnetic hinge 14 and a support surface, such as a surface of base 56, subtends a non-zero angle. In one embodiment, panels 12 are non-interlockingly engaged with each other in a closed position, i.e., adjacent panels 12 lack interlocking or interacting features when surfaces 20 of adjacent panels 12 are brought together or collapsed.

The drawings of FIGS. 23 and 24 are upper perspective views of respective free-standing modular panel structures 10 and systems of embodiments of the present invention. These embodiments function mechanically like FIGS. 1 and 2, a difference being the frameless panels are combined with panel-less frames 17. The panel-less frames 17 may be tubular, such as rectangular or round or other suitable geometry, but may also be composed of a magnetic material and align with the magnets in the frameless panels 12. Panel-less frames 17 can join interchangeably to other panel-less frames 17 as in FIG. 24, or to panels 12. The possible configurations are endless. Further, panel-less frames 17 can be stacked in a manner similar as shown in FIG. 6 with panels 46 buttressing the display for panel support and stability. The detail corresponding with region 21 of FIG. 23 is more clearly shown in enlarged FIGS. 21A and 21B.

In an embodiment, corresponding with region 21 of FIG. 1, and more clearly shown in enlarged FIGS. 21A and 21B (showing different rotational orientations between adjacent panels 12 about ends 18), the panels 12 can have a plurality of magnets 16, such as 8 cylindrical magnets of about ¾ inches in length each located along the longer (vertical) edges 18, and thus the total length of the magnets would be less than 10% of the length of a 6-foot-tall panel. The magnets 16 are located in the same positions along the corresponding edges 18 to assure easy and proper alignment. In one embodiment, tube members 24 may be utilized to help position the magnets. Since magnets 16 are capable of rotational movement about an axis of edges 18, polarity of the magnets means nothing, i.e., so long as the magnets 16 are aligned with each other along edges 18, the pair of magnets 16 are free to rotate so that the pair of magnets are attracted to one another to ensure a magnetic hinge 14 is established. It is to be understood that the arrangement of FIGS. 21A and 21B can be applied to a door structure, such as a cabinet and cabinet door, such as discussed in further detail below.

Turning to FIGS. 3-5, there are shown respective upper perspective views of three embodiments of structures 26 of the present invention, illustrating by way of example, how magnetic panels 12 can be arranged to form volumetric shapes that are capable of structural properties beyond the strength of the magnets (not shown) forming magnetic edges or joints, such as magnetic hinge joints 14 as previously discussed. Thus, for example the structures 26 can have strengths that are 2×, 3×, 4× and more than the strength of the individual magnetic hinge 14. FIGS. 3-5 show structures 26, such as cabinets that are triangular, square, and rectangular respectively. Note FIGS. 3-5 each have tops 28 or lids with grooves 30 formed in the surface of the tops that is configured to be received by facing ends of the panels of any geometric shape can fit into. Additionally, as shown in FIG. 4, lid 28 may be inverted and used as a bottom, providing increased strength while providing an aesthetically pleasing appearance. FIG. 5 includes a door 32 secured to a panel 13 of structure 26 by magnetic hinges 34. As shown, door 32 is inset, but may also be configured to overlay panel 13. Also shown in FIG. 5, latching magnets 36 may be positioned on the opposite side of the door. Assembly is simple. Simply place panels 12, 13 on floor or support surface in a shape that corresponds to the grooves 30 formed in the lid/top 28 and simply install the top over and onto the ends of the panels 12, 13, i.e., grooves 30 receive the ends of the facing panels. The combination of the magnetic hinge joints 14 of structure 26 with the grooved top 28 provide sufficient structure for a temporary cabinet or pedestal for a trade show. In these embodiments the magnets forming the magnetic edges may be up to about 98% the length of the edge of the panel 12, 13 and may be located on all four edges. In this manner the panels can be assembled together without regard for identification of edges having magnets, as previously discussed. Further, the tops 28 can have magnets (not shown) configured to join to the magnets in the end edges of the panels, providing greater strength.

Preferably, when the magnets are less than 100% the length of the panel, they should be positioned in exactly the same location along the edge in each panel, e.g., centered, x inches for an end, etc. In this manner the similar locations of the magnets in the panel edges assure easy and proper alignment of the panels during assembly.

Turning to FIGS. 6 and 7, there is shown an upper perspective view of two embodiments of the present invention illustrating, by way of example, examples of respective multi-level displays 40, 50 or wall partitions comprised of panels. For example, multi-level display 40 of FIG. 6 includes panels 42, 44, 46 interconnected by magnetic hinge joints 48, with panels 46 buttressing the multi-level display for panel support and stability. The placement of multiple panels, 42, 44 having edges offset from one another, effect structure to prevent the panels from collapse and aid ease of assembly. FIG. 7 shows multiple-level display 50 with panels 52 inserted into a base 54, similar to a base 56 used with panel structure 10 of FIGS. 1 and 2. In one embodiment, the base may incorporate a magnetic joint 48, such as shown for base 54 in FIG. 7. For example, in one embodiment as shown in FIG. 7, base 54 includes four magnets 16 positioned interior of the base 54, and magnetic joints 48 are formed with each panel 12 in response to a magnet 16 of facing edges of each panel being aligningly brought together, with at least one of the magnetic joints 48 not being collinear with another magnetic joint 48.

FIG. 7 also depicts the effect of folding to aid stability of the structure. For assembly, the two adjacent panels 52 effecting a fold along magnetic hinge 48 must be installed together. In this embodiment, each panel has magnetic edges on all four of its edges. The panels in these embodiments are all the same size, i.e., same length and width. Thus, it can be seen how a system having only one type of panel (i.e., all having the same shape and size) can be configured into many different structures.

Figure 9:
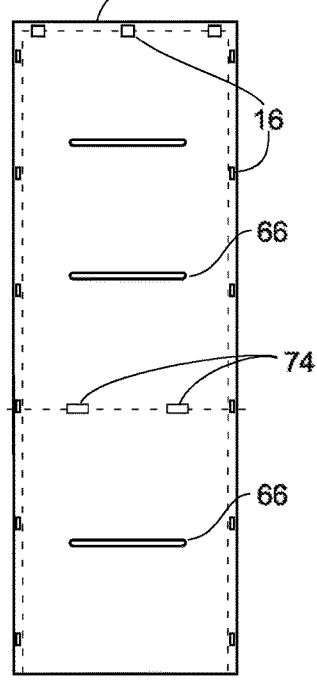
FIG. 9 is a front view of an exemplary panel according to the present invention.
Figure 10:
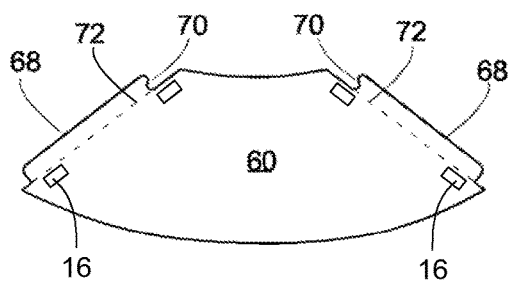
FIG. 10 is a plan view of an exemplary shelf according to the present invention.

Turning to FIGS. 8-10, there is shown an upper perspective view of an embodiment of screen or panel structure 58 including panels 62, 64 with shelf members 60 of the present invention. Thus, FIG. 8 shows how a combination of folding panels 62 assembled in conjunction with slip-fit-locking shelf members 60 provides both a sturdy structure and a system of repetitive shelving for product display. As shown in FIG. 9, panel 62 includes a plurality of slots 66 formed therein to receive one end of shelf member 60, with the other end of the shelf received in a corresponding slot 66 formed in an adjacent panel 62. As further shown in FIG. 9, the outer peripheral edges of panel 62 include magnets 16 inserted at strategic distances around the perimeter of the panel from which to form magnetic joints with adjacent panels of the panel structure. Shelf members 60 can be any material suitable for supporting product display. FIG. 10 shows a typical shelf member 60 including opposed tabs 68 that fit into and through corresponding slot 66 of panels 62 as shown in FIG. 8. A close look at FIG. 10 shows how the tabs 68 have a hook 70 that makes a slight extension to the tab, to lock with the magnetic panels 12 to assure a study structure. The multi-level panel shelving system can be disassembled to flat parts that are sized for small package shipping or can be transported in an automobile. In one embodiment, shelf member 60 may include opposed edges 72 having magnets 16 that would form a magnetic joint with corresponding magnets 74 (FIG. 9) of panel 62, instead of with slots 66.

Turning to FIGS. 11-16, there is shown the progression of how multiple panels 76, 78 of a panel structure, such as a modular panel structure 75, can be collapsed or folded while maintaining a self-organizing condition. FIG. 11 shows panels 76, 78 in the open or fully expanded display or screen mode. As shown, modular panel structure 75 includes a plurality of rectangular panels 76 defining a panel grouping 80 secured together by corresponding vertical magnetic hinges 84 rotatable about axes parallel to the corresponding edges of panels 76, and a plurality of rectangular panels 78 defining a panel grouping 82 secured together by corresponding vertical magnetic hinges 86 rotatable about axes parallel to the corresponding edges of panels 78. The axes of magnetic hinges 84, 86 are parallel to and coincident with each other. Upper edges of panels 78 of panel grouping 82 vertically support corresponding lower edges of panels 76 of panel grouping 80 along a horizontal magnetic hinge 88 that is perpendicular to magnetic hinges 84, 86. To fold up the panel structure, the panels arranged in an accordion-like manner are pushed together from either side, the magnets of respective magnetic hinges 84, 86, 88 maintaining alignment and organization as the panels are brought together. As a result, as shown sequentially in FIGS. 12 and 13, panels 76, 78 of respective panel groupings 80, 82 are simultaneously rotated about their corresponding magnetic hinges 84, 86 toward one another until achieving a closed position. As sequentially shown in FIGS. 14-16, panel groupings 80, 82 are then simultaneously rotated about magnetic hinge 88 toward one another until achieving a fully collapsed position 92 (FIG. 16), defining single, self-aligning, organized pile of panels.

Figure 17:
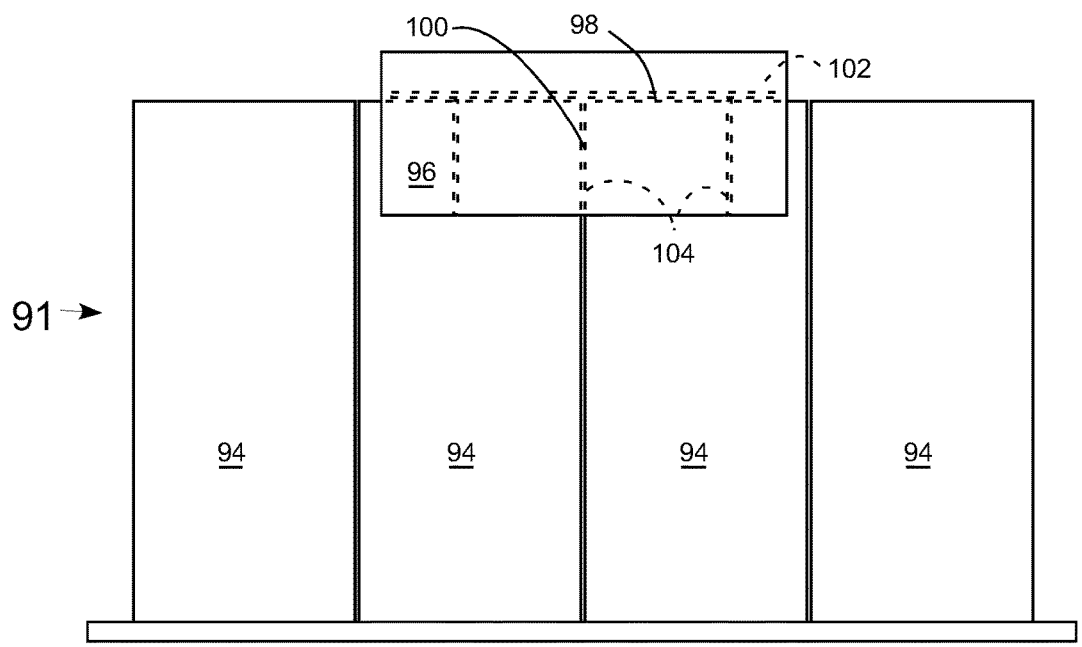
FIG. 17 is a front view of an exemplary embodiment of a panel structure according to the present invention.
Figure 18:
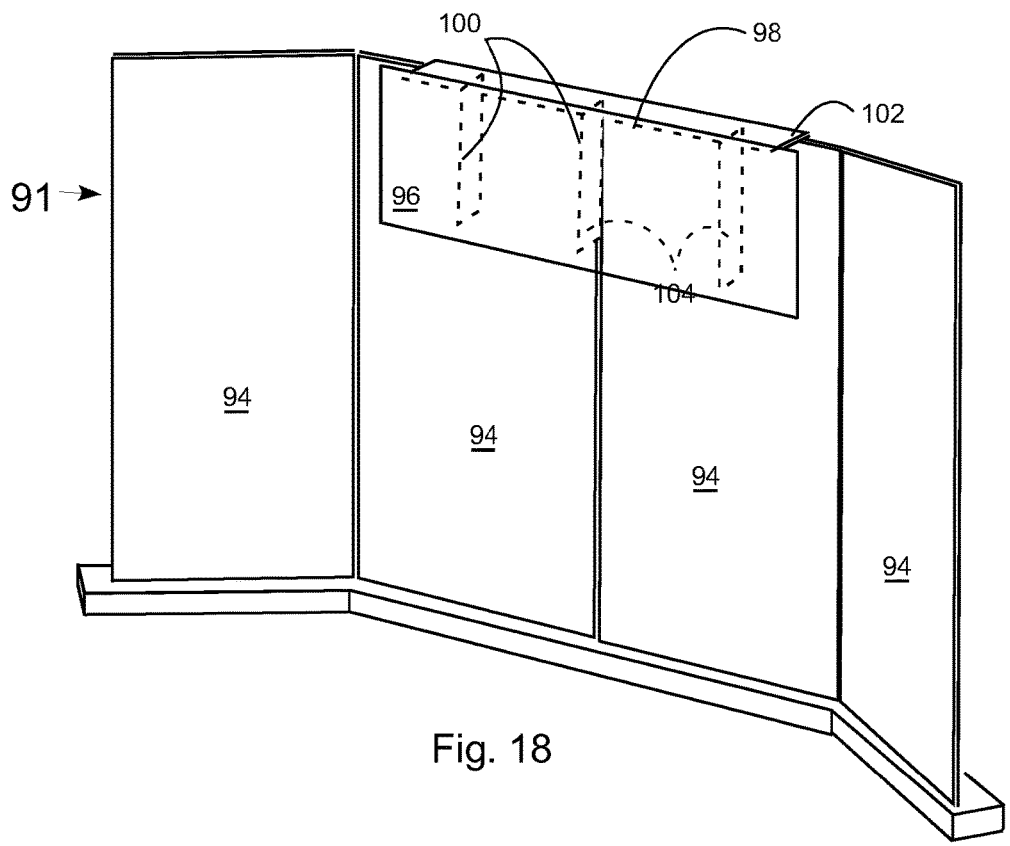
FIG. 18 is an upper perspective view of the panel structure of FIG. 17 according to the present invention.

Turning to FIGS. 17, 18, there is illustrated the opportunity to use magnets or magnets imbedded in one panel and/or a material that responds to magnetism in another panel to form 3D shapes offset from the plane of the screen or display. That is, as shown in FIG. 17, a panel structure 91 includes panels 94 that are offset from a panel 96 by virtue of magnetic joints 98, 100 positioned interior of panel 96 and distal of its peripheral edges, i.e., the magnetic joints are not adjacent to the edge, and do not form a part of the edge of the panel. As further shown in FIG. 18, which is an upper perspective view of the panel structure 91 of FIG. 17, panel 102, which corresponds with magnetic joint 98, offsets panel 96 from corresponding panels 94, and panel 104, which corresponds with magnetic joint 100, also helps offset panel 96 from corresponding panels 94. A further advantage beyond the obvious stand out graphics is that this construction can also act to reinforce and increase the rigidity of the structure.

The use of hollow core, which includes corrugated or fluted plastic makes it easy to insert magnets or a magnetic responsive rod anywhere through the flutes. In one embodiment, magnets may be inserted in a panel, for instance in panel 102, which in this case is perpendicular to and straddles the adjacent panels 94. This exemplary panel construction illustrates the offset nature of the panels and how it can reinforce the structure of the two center panels 94 without the use of a fold.

Turning to FIGS. 19A, 19B, 19C, and 20 there is provided upper perspective views of an embodiment of the present invention illustrating how the use of multiple magnetic orientations inserted into a panel can achieve different outcomes in function depending on how the panel is moved. FIGS. 19A and 20 show a cabinet door 106 of a cabinet 108 in a closed position. FIG. 19B shows cabinet 108 with door 106 open to about 60 degrees. In this instance, door 106 closes automatically upon release. However, if the same cabinet door 106 is opened further, for example, to about 90 to about 120 degrees, the door stays open. These two outcomes are achieved by having two different magnet geometries. FIG. 20 shows a cylindrical magnet 110 positioned interior of door 106 along an edge, in which magnet 110 will rotate relative to the door as the door is opened (in this case, magnet 110 remains in position as door 106 rotates relative to cabinet 108 about the magnetic joint) to maintain its attraction with a corresponding magnet 112 positioned interior of the cabinet. So, no matter how far the door is opened, the poles of the magnets 110, 112 are always aligned to have the greatest attraction. As shown in FIG. 20, magnets 112, 114 are rectangular. As the door opens, magnet 114 is unable to rotate or incapable of rotating relative to the door, so the magnetic force between magnets 112, 114 dissipates as the door is rotated away from its closed position, which closed position having the greatest attraction force between the magnets. If the door is partially opened, such as shown in FIG. 19B the door closes itself upon release. However, if the door is further opened to about 110 degrees (FIG. 19C), the magnetic attraction force 112, 114 is so minimal that the door stays open upon release. In this instance, the cylindrical magnets 110 hold the door to stile 116 of the cabinet. If the door is given a gentle push toward the closed position, the door will then close all the way by itself. In one embodiment, more than one non-rotatable pair of magnets, such as magnets 112, 114 may be used with a magnetic joint.

In one embodiment, an arrangement of one or more magnets, such as magnets 114 positioned in a manner similar to FIG. 22A may be incorporated into one or more panels of a panel structure, such as one or more panels 12 of FIGS. 1 and 2.

The following examples are provided to illustrate various embodiments of the present components and systems and operations. These examples are for illustrative purposes and should not be viewed as, and do not otherwise limit, the scope of the present invention.

EXAMPLE 1

Magnetic panels be arranged to form geometric shapes that are capable of structural properties beyond the strength of the magnets. They can assemble into cabinets or structures that hold literature or storage. Parts can ship flat and be sized for small package transportation.

EXAMPLE 2

Magnetic panels can be structurally sound when stacked upon one another to make multi-level displays or partitions. The tenacious strength of the magnets in this configuration was surprising and unexpected. The purpose and importance of stacking the panels is that exhibits/presentations can be quickly assembled from standard size shipping sizes that are sufficiently small to fit into a van or SUV.

EXAMPLE 3

Magnetized panels can be designed to be assembled in conjunction with shelving to form structural units capable of holding products for display. These components can be quickly assembled in modular form and stacked upon one another. They can also be quickly connected horizontally to other similar shelving systems or to printed graphic panels.

EXAMPLE 4

Magnetic panels can be arranged to form geometric shapes that protrude 3 dimensionally from a panel screen. The advantage of this aspect is to provide stand out graphics.

EXAMPLE 5

Stacked magnetic panel screens comprising multiple panels can accordion fold with an upper level, and then fold into the lower level, even though the upper level comprises multiple panels deep, to collapse into a single, self-aligning, organized pile.

EXAMPLE 6

Magnetic panels can be arranged to buttress a screen from the center of the center of a magnetic panel without using opposing magnets but with a material that responds to a magnetic force.

EXAMPLE 7

A single magnetic cover or panel or door can be programmed by using different magnet configurations, e.g., having similar or different combinations of magnet pairs 110, 112 and 112, 114, so the cover performs differently depending on how far it opens. For instance, doors using the virtual hinge as described in U.S. Pat. No. 8,196,260, can benefit from this improvement. When removing a single glass from cabinet 108 (FIGS. 20, 22a), the door 106 automatically closes itself. However, when unloading the dishwasher (not shown), or putting away groceries (not shown), for example, it may be desirable to put multiple items at a time into the cabinet, but with the self-closing feature previously discussed, two hands may be insufficient to do this. To address this undesirable situation and keep the door 106 open for these types of activities that typically require longer times for the door to remain open, cylindrical magnets 112, 114 (FIG. 22C) can be used to keep the door 106 open. In this manner, when the door 106 is sufficiently opened to a certain position (e.g., FIG. 22B), the magnetic hinge will remain open, although prior to reaching that position, the door will continue to have its self-closing feature. FIGS. 22A, 22B, 22C show the shift between magnet pairs 112, 114 between the various opening positions of door 106 relative to the cabinet 108, in which the magnetic forces between magnetic pairs 112, 114 is greatest (FIG. 22A), somewhat reduced (FIG. 22B), and more significantly reduces (FIG. 22C). Other magnetic pair arrangements may be used depending upon the desired behavior.

It is noted that there is no requirement to provide or address the theory underlying the novel and groundbreaking processes, materials, performance or other beneficial features and properties that are the subject of, or associated with, embodiments of the present invention. Nevertheless, various theories are provided in this specification to further advance the art in this area. The theories put forth in this specification, and unless expressly stated otherwise, in no way limit, restrict or narrow the scope of protection to be afforded the claimed invention. These theories may not be required or practiced to utilize the present invention. It is further understood that the present invention may lead to new, and heretofore unknown theories to explain the function features of embodiments of the methods, articles, materials, devices, and system of the present invention; and such later developed theories shall not limit the scope of protection afforded the present invention.

The various embodiments of systems, equipment, techniques, methods, activities, and operations set forth in this specification may be used for various other activities and in other fields in addition to those set forth herein. Additionally, these embodiments, for example, may be used with: other equipment or activities that may be developed in the future; and with existing equipment or activities which may be modified, in part, based on the teachings of this specification. Further, the various embodiments set forth in this specification may be used with each other in different and various combinations. Thus, for example, the configurations provided in the various embodiments of this specification may be used with each other; and the scope of protection afforded the present invention should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

Other features and advantages of the present invention will be apparent from the following more detailed description, taken in conjunction with the accompanying drawings which illustrate, by way of example, the principles of the invention.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed:

1. A modular panel comprising:
a frameless panel having opposed surfaces and at least three linear outer peripheral edges;
each edge separating and in contact with the opposed surfaces;
at least two edges of the panel having at least one magnet positioned interior of the panel and extending therealong;
the at least one magnet capable of rotation about an axis of the at least two edges relative to the panel;
wherein a magnetic hinge is formed in response to the at least one magnet of one edge of the at least two edges of the panel being aligningly brought together with one edge of at least two edges of another panel, the magnetic hinge forming a free-standing panel structure stabilizingly supported solely by the magnetic hinge;
wherein each panel edge of the another panel comprises at least one second magnet interior of the panel and incapable of rotation about the axis of a corresponding edge relative to the another panel.

2. The modular panel of claim 1, wherein the panel is generally planar.

3. The modular panel claim 1, wherein the panel is made from a lightweight corrugated or honeycomb material or a lightweight plastic material or a lightweight cellulosic material or a lightweight composite material.

4. The modular panel of claim 1, wherein a composite comprises a plastic and a reinforcing material.

5. The modular panel of claim 4, wherein the reinforcing material is selected from the group consisting of fibers, nanotubes, powders, pellets, tow, staple fibers, structures, woven materials, non-woven materials and a combination thereof.

6. The modular panel of claim 4, wherein the reinforcing material is selected from the group consisting of ceramics, glasses, graphite, carbon, metal powders, carbide pellets or components, staple fibers, tow, nanostructures, plastics and a combination thereof.

7. The modular panel of claim 1, wherein each panel edge has at least one magnet positioned interior of the panel and extending therealong, the at least one magnet capable of rotation about the axis of a corresponding edge relative to the panel.

8. The modular panel of claim 7 further comprises printed material in the form of graphics, promotions, signage or advertisements on at least one surface of the opposed surfaces.

9. The modular panel of claim 1 further comprises printed material in the form of graphics, promotions, signage or advertisements on at least one surface of the opposed surfaces.

10. The modular panel of claim 1 further comprises printed material in the form of graphics, promotions, signage or advertisements on at least one surface of the opposed surfaces.

* * * * *